(12) United States Patent
Higgins

(10) Patent No.: US 8,776,388 B2
(45) Date of Patent: Jul. 15, 2014

(54) APPARATUS AND METHOD FOR MEASURING A NOZZLE

(75) Inventor: Christopher D. Higgins, Greenville, SC (US)

(73) Assignee: General Electric Company, Schenectady, NY (US)

( * ) Notice: Subject to any disclaimer, the term of this patent is extended or adjusted under 35 U.S.C. 154(b) by 639 days.

(21) Appl. No.: 13/007,699

(22) Filed: Jan. 17, 2011

(65) Prior Publication Data

US 2012/0180333 A1     Jul. 19, 2012

(51) Int. Cl.
    *G01B 5/004*     (2006.01)
(52) U.S. Cl.
    USPC ............................................. 33/551; 33/645
(58) Field of Classification Search
    CPC ..... G01B 5/0004; G01B 21/047; G01B 21/04
    USPC ........... 33/541, 546, 549, 551, 554, 555, 645,
                    33/552–553; 29/890.142; 73/1.79
    See application file for complete search history.

(56) References Cited

U.S. PATENT DOCUMENTS

| | | | |
|---|---|---|---|
| 2,839,836 A * | 6/1958 | Fuller | 33/552 |
| 3,464,119 A * | 9/1969 | Griggs | 33/552 |
| 3,653,128 A * | 4/1972 | Palmenberg | 33/555 |
| 3,757,424 A * | 9/1973 | Palmenberg | 33/534 |
| 3,832,784 A * | 9/1974 | Samuels et al. | 33/504 |
| 4,016,747 A * | 4/1977 | Radev | 73/37.9 |
| 4,121,451 A * | 10/1978 | Radev et al. | 73/37.9 |
| 4,222,172 A * | 9/1980 | Mason | 33/548 |
| 4,327,495 A * | 5/1982 | Plante | 29/889.22 |
| 4,509,265 A * | 4/1985 | Donaldson | 33/549 |
| 4,665,625 A * | 5/1987 | Ireland et al. | 33/530 |
| 4,718,172 A * | 1/1988 | Rouse et al. | 33/530 |
| 5,238,366 A * | 8/1993 | Ferleger | 416/61 |
| 5,287,631 A * | 2/1994 | Stade | 33/823 |
| 5,625,958 A * | 5/1997 | DeCoursey et al. | 33/555 |
| 6,842,995 B2 * | 1/2005 | Jones et al. | 33/645 |
| 6,983,659 B2 | 1/2006 | Soechting et al. | |
| 7,017,431 B2 * | 3/2006 | King et al. | 73/865.8 |
| 7,578,164 B2 * | 8/2009 | Sherlock et al. | 73/1.79 |
| 7,797,851 B2 * | 9/2010 | Funabashi et al. | 33/561 |
| 8,127,581 B2 * | 3/2012 | Davis et al. | 72/31.03 |

* cited by examiner

*Primary Examiner* — R. A. Smith
*Assistant Examiner* — Tania Courson
(74) *Attorney, Agent, or Firm* — Dority & Manning, PA

(57) ABSTRACT

An apparatus for measuring a nozzle includes a stand and a first sensor in sliding engagement with the stand. The first sensor is positioned to measure a first dimension of the nozzle. A method for measuring a nozzle includes placing the nozzle in a stand, sliding a first gauge along a first surface of the nozzle, and measuring a first dimension of the nozzle.

14 Claims, 3 Drawing Sheets

APPARATUS AND METHOD FOR MEASURING A NOZZLE

FIELD OF THE INVENTION

The present invention generally involves an apparatus and method for measuring a nozzle. For example, various embodiments of the present invention may measure radial and/or axial displacement of the nozzle that may occur during use.

BACKGROUND OF THE INVENTION

Nozzles are commonly included in various forms of commercial equipment. For example, compressors and turbines frequently include multiple stages of nozzles, also referred to as stators, that direct a working fluid onto a downstream rotating blade or bucket.

Over time, the flow of the working fluid over the nozzle may plastically deform the shape and/or profile of the nozzle, a condition also known as "creep." For example, air flow over the nozzle may plastically deform the nozzle, causing one side of the nozzle to rotate counterclockwise and the trailing edge of the nozzle to bend in the direction of the air flow. Although visual inspections may be performed to detect excessive amounts of creep, the inventor of the present invention is not currently aware of any apparatus or method for accurately and precisely measuring creep or other plastic deformation in nozzles. Therefore, an apparatus and method for accurately and precisely measuring nozzles would be useful.

BRIEF DESCRIPTION OF THE INVENTION

Aspects and advantages of the invention are set forth below in the following description, or may be obvious from the description, or may be learned through practice of the invention.

One embodiment of the present invention is an apparatus for measuring a nozzle. The apparatus includes a stand and a first sensor in sliding engagement with the stand. The first sensor is positioned to measure a first dimension of the nozzle.

Another embodiment of the present invention is an apparatus for measuring a nozzle that includes a platform configured to align the nozzle to a predetermined position. A first sensor is connected to the platform and aligned with a first surface of the nozzle.

The present invention may also include a method for measuring a nozzle. The method may include placing the nozzle in a stand, sliding a first gauge along a first surface of the nozzle, and measuring a first dimension of the nozzle.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
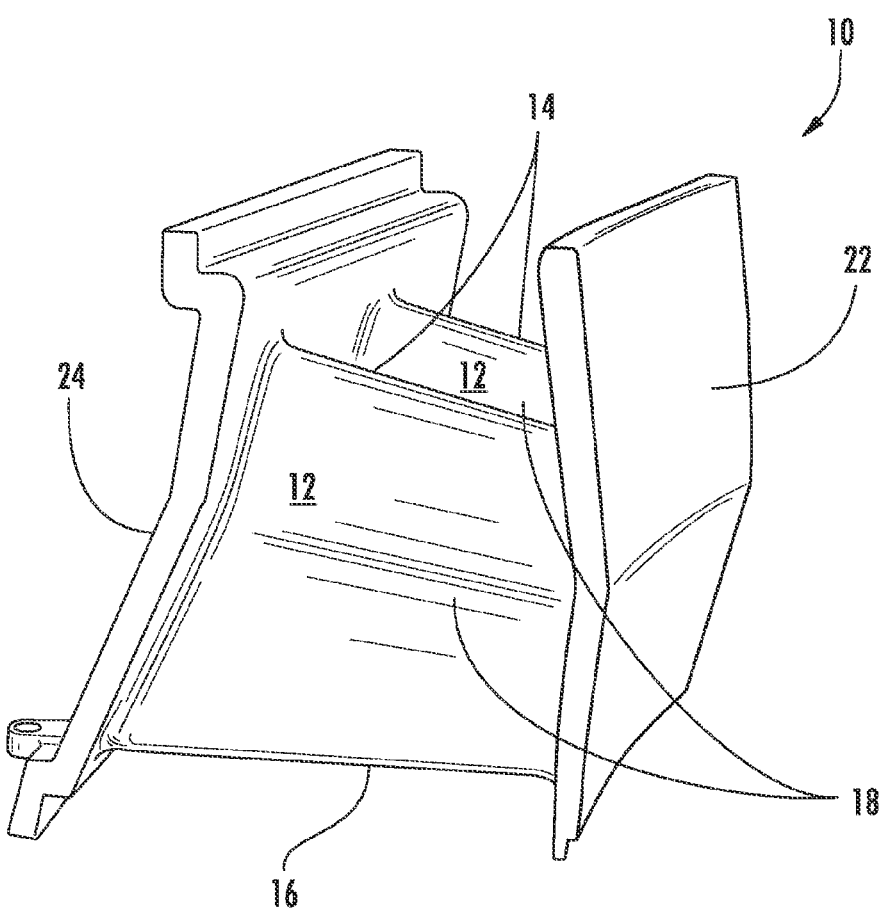
FIG. 1 is a perspective view of an exemplary nozzle.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

Each example is provided by way of explanation of the invention, not limitation of the invention. In fact, it will be apparent to those skilled in the art that modifications and variations can be made in the present invention without departing from the scope or spirit thereof For instance, features illustrated or described as part of one embodiment may be used on another embodiment to yield a still further embodiment. Thus, it is intended that the present invention covers such modifications and variations as come within the scope of the appended claims and their equivalents.

Various embodiments of the present invention provide an apparatus and a method for measuring deformation such as creep in a nozzle. In particular embodiments, the apparatus that measure one or more dimensions of the nozzle to determine an axial and/or radial dimension of the nozzle. As used herein, an axial dimension of the nozzle refers to a dimension generally in the same direction as or parallel to the fluid flow through the nozzle. As used herein, a radial dimension of the nozzle refers to a dimension generally perpendicular to the fluid flow through the nozzle.

FIG. 1 shows an exemplary nozzle 10, such as a nozzle that might be included in a compressor or a turbine, to provide context for various embodiments of the present invention. As shown, the exemplary nozzle 10 generally includes a pair of vanes 12, with each vane 12 having a leading edge 14, a trailing edge 16, a pressure side 18, and a vacuum side (not visible). The leading-edge 14 is typically rounded, and the trailing edge 16 is typically pointed. The pressure side 18 typically has a concave curvature, and the vacuum side typically has a convex curvature. The leading-edge 14, trailing edge 16, pressure side 18, and vacuum side combine to form an airfoil for each vane 12. As shown in FIG. 1, an inner wall 22 and an outer wall 24 may connect the pair of vanes 12 to form the nozzle 10. The outer wall 24 is then typically connected to a stationary portion of the particular equipment, such as the casing of a compressor or turbine, and the inner wall 22 is typically proximate to a rotating component, such as a rotor. In this manner, the working fluid flows from top to bottom as shown in FIG. 1 between the pair of vanes 12 and the inner and outer walls 22, 24 to the downstream components.

Over time, the flow of the working fluid over the nozzle 10 may plastically deform the shape and/or profile of the nozzle 10, a condition also known as "creep." For example, air flow over the exemplary nozzle 10 shown in FIG. 1 may plastically deform the nozzle 10, causing the inner wall 22 to rotate clockwise and the inner portion of the trailing edge 16 to move in the direction of the air flow.

Figure 2:
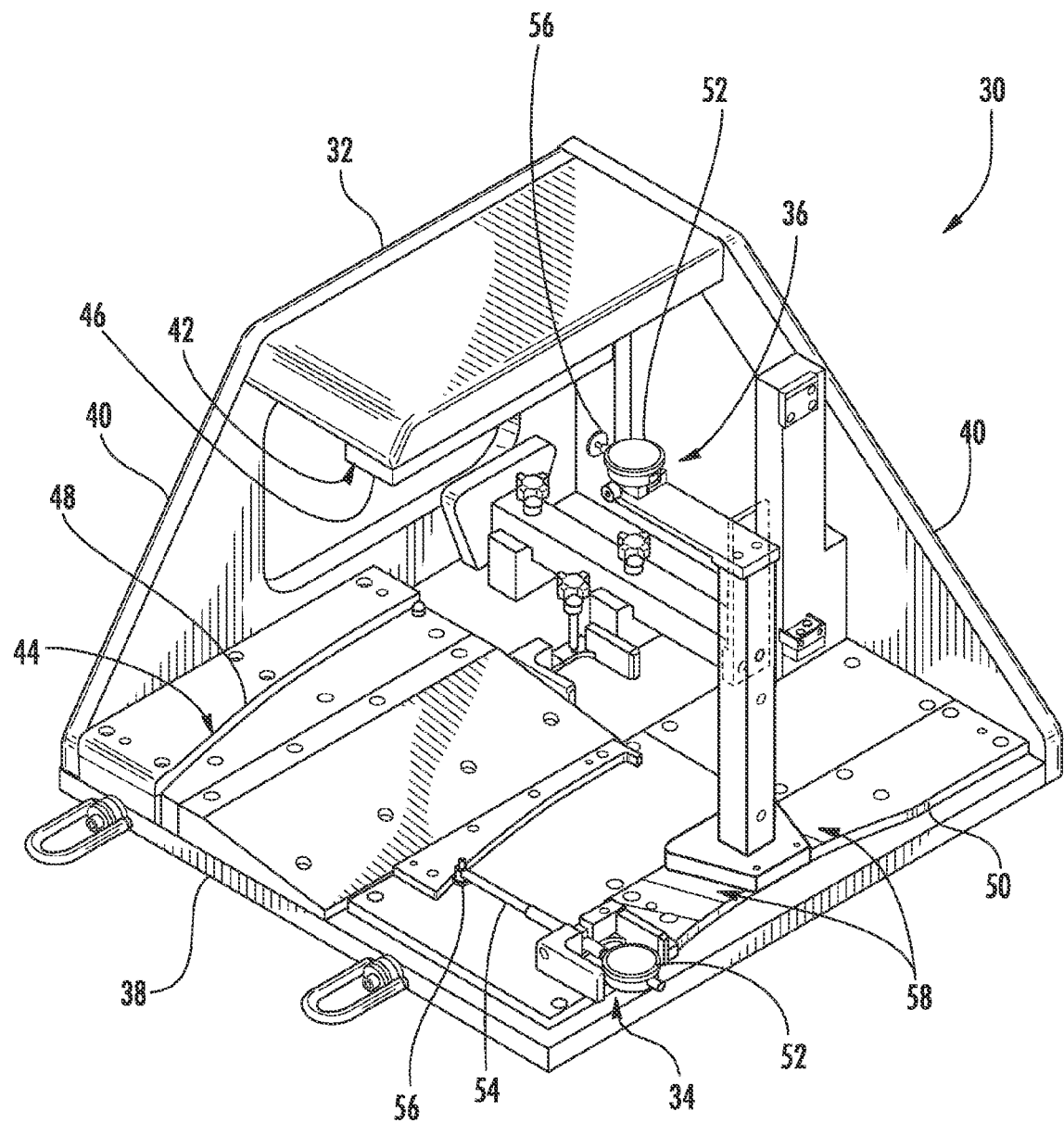
FIG. 2 is a perspective view of an apparatus according to one embodiment of the present invention.
Figure 3:
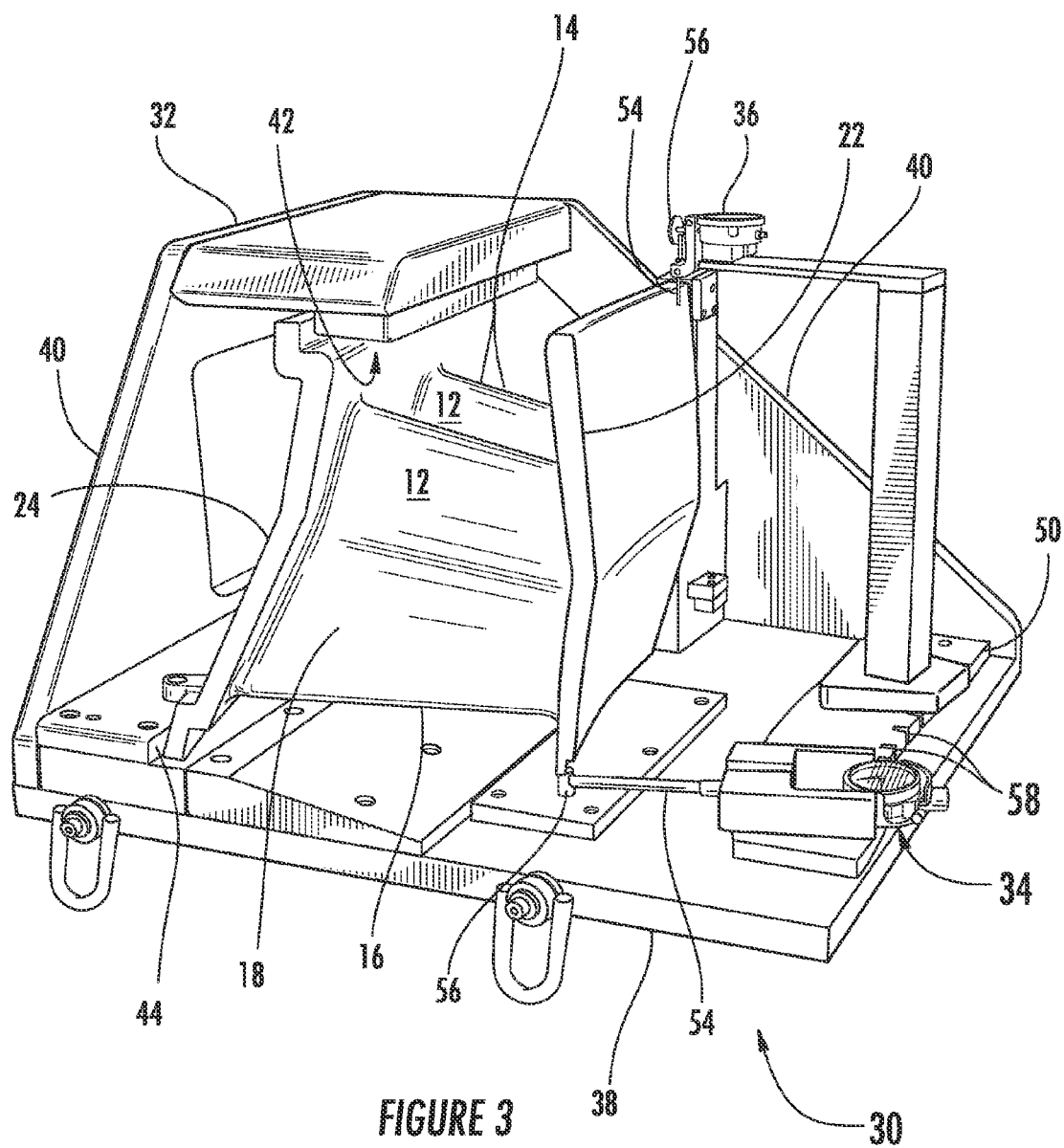
FIG. 3 is a perspective view of the nozzle shown in FIG. 1 being measured by the apparatus shown in FIG. 2.

FIG. 2 provides a perspective view of an apparatus 30 according to one embodiment of the present invention, and FIG. 3 provides a perspective view of the nozzle 10 shown in FIG. 1 being measured by the apparatus 30 shown in FIG. 2. As shown, the apparatus 30 generally comprises a stand or platform 32 and one or more sensors 34, 36. The stand or platform 32 may comprise any suitable structure or framework of sufficient size and weight to hold or support the nozzle 10 being measured. For example, the stand or platform 32 may comprise a container in which the nozzle 10 is placed. Alternately, as shown in FIG. 2, the stand or platform 32 may comprise a substantially horizontal base 38 and one or more substantially vertical walls 40 that may surround, encase, or envelop the nozzle 10 being measured.

In addition, the base 38 and/or walls 40 may provide one or more attachment points for the nozzle 10 and the sensors 34, 36. In the particular embodiment shown in FIGS. 2 and 3, the stand or platform 32 includes a top attachment 42 and a bottom attachment 44 for holding the nozzle 10 in a desired alignment or predetermined position. As shown in FIGS. 2 and 3, the top attachment 42 may comprise, for example, a flange 46 that engages with and provides a complementary surface to the front or leading edge of the outer wall 24. Similarly, the bottom attachment 44 may comprise, for example, a flange 48 that engages with and provides a complementary surface to the rear or trailing edge of the outer wall 24. In particular embodiments, the attachments 42, 44 may comprise a clamp, a clip, a vise, a threaded engagement, or various other mechanical devices known to one of ordinary skill in the art for attaching to and holding objects in place, and the particular type of attachment included in any embodiment is not a limitation of the present invention unless specifically recited in the claims. In addition, the one or more attachments, if present, may be located or arranged on the stand or platform 32 to engage various parts of the nozzle 10. For example, the attachments may be located or arranged on the base 38 or walls 40 to engage with the leading and/or trailing edges of the inner wall 22.

The base 38 and/or walls 40 may also provide attachment points for the sensors 34, 36. For example, as shown in FIGS. 2 and 3, one or both of the sensors 34, 36 may be connected to a slide 50 on the base 38 so that the sensors 34, 36 are in sliding engagement with the stand or platform 32. Each sensor 34, 36 may comprise a gauge 52 aligned with a predetermined surface of the nozzle 10. For example, as shown in FIG. 3, the first sensor 34 may be aligned with the trailing edge of the inner wall 22, and the second sensor 36 may be aligned with the leading edge of the inner wall 22. An arm 54 and plunger 56 may be connected to each gauge 52 so that as the sensors 34, 36 move along the slide 50, independently or in unison, the plunger 56 may move to reflect the location of the respective surface along the length or width of the nozzle 10. The slide 50 and/or base 38 may also include one or more detents 58 that engage with one or more of the sensors 34, 36 at predetermined locations. The sensors 34, 36 may move along the slide 50 and/or base 38, and a measurement may be taken as the sensors 34, 36 reach each detent 58. In this manner, the first sensor 34 may detect and measure changes in an axial dimension of the nozzle 10, and the second sensor 36 may detect and measure changes in a radial dimension of the nozzle 10.

The apparatus shown in FIGS. 2 and 3 also provides a method for measuring the nozzle 10. The method may include, for example, placing the nozzle 10 in the stand 32 and sliding one or more gauges 34, 36 along a surface of the nozzle 10 to measure one or more dimensions of the nozzle 10. The method may further include vertically aligning a surface of the nozzle 10 before measuring the nozzle 10 and/or measuring the one or more dimensions at predetermined points along the nozzle 10. In particular embodiments, the one or more gauges 34, 36 may be operated independently or simultaneously to measure a plurality of dimensions of the nozzle 10. The measurements may then be collected and cross-referenced to original design drawings of the nozzle 10 to determine whether repairs or replacement of the nozzle 10 are necessary.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other and examples are intended to be within the scope of the claims if they include structural elements that do not differ from the literal language of the claims, or if they include equivalent structural elements with insubstantial differences from the literal languages of the claims.

What is claimed is:

1. An apparatus for measuring a nozzle comprising:
a stand;
a first sensor in sliding engagement with said stand, wherein said first sensor is slidable along a slide of the stand in a first direction and measures a radial dimension of the nozzle as the first sensor slides along the first direction; and
a second sensor in sliding engagement with said stand, wherein said second sensor is slidable along the slide in the first direction and measures an axial dimension of the nozzle as the second sensor slides along the first direction.

2. The apparatus as in claim 1, wherein said stand comprises an attachment for the nozzle.

3. The apparatus as in claim 1, wherein said stand comprises a plurality of attachments for the nozzle.

4. The apparatus as in claim 1, wherein said stand comprises a detent configured to engage with said first sensor.

5. The apparatus as in claim 1, wherein said first sensor measures the radial dimension of the nozzle at a plurality of locations on the nozzle.

6. An apparatus for measuring a nozzle comprising:
a platform configured to align the nozzle to a predetermined position, the platform comprising a slide;
a first sensor connected to said platform and aligned with a first surface of the nozzle, said first sensor slidable along the slide in a first direction, wherein the first sensor measures a radial dimension of the nozzle as the first sensor slides along the first direction; and
a second sensor connected to said platform and aligned with a second surface of the nozzle, said second sensor slidable along the slide in the first direction, wherein the second sensor measures an axial dimension of the nozzle as the second sensor slides along the first direction.

7. The apparatus as in claim 6, wherein said second sensor is slidably engageable with a detent.

8. The apparatus as in claim 6, wherein said platform comprises at least one attachment for the nozzle.

9. The apparatus as in claim 6, wherein said first sensor is slidably engageable with a detent.

10. A method for measuring a nozzle comprising:
placing the nozzle in a stand;
sliding a first gauge along a first surface of the nozzle in a first direction, the first direction defined along a slide of the stand; measuring a radial dimension of the nozzle as the first gauge slides along the first surface;
sliding a second gauge along a second surface of the nozzle in the first direction; and
measuring an axial dimension of the nozzle as the second gauge slides along the second surface.

11. The method as in claim 10, further comprising vertically aligning a surface of the nozzle.

12. The method as in claim 10, further comprising measuring the first dimension of the nozzle at predetermined points.

13. The method as in claim 10, further comprising measuring the second dimension of the nozzle at discrete points along the second surface of the nozzle.

14. The method as in claim 10, further comprising simultaneously measuring the first and second dimensions of the nozzle.

* * * * *